Nov. 8, 1932.  W. C. GRAUL  1,886,395

SHAFT BEARING

Filed July 24, 1930

INVENTOR.
William C. Graul
BY
Francis D. Hardesty
ATTORNEY.

Patented Nov. 8, 1932

1,886,395

UNITED STATES PATENT OFFICE

WILLIAM C. GRAUL, OF DETROIT, MICHIGAN, ASSIGNOR, BY MESNE ASSIGNMENTS, TO TIMKEN SILENT AUTOMATIC COMPANY, OF DETROIT, MICHIGAN, A CORPORATION OF MICHIGAN

SHAFT BEARING

Application filed July 24, 1930. Serial No. 470,299.

The present invention relates to shaft bearings and lubricating means therefor, and specifically to means for maintaining a free flow of lubricant to said bearings to prevent overheating.

Among the objects of the invention is an enclosed bearing containing a relatively large quantity of lubricant which is maintained in motion over the bearing surfaces.

Another object is a bearing assembly having a self-contained circulating means.

Another object is a verticaly arranged bearing assembly having means for insuring a proper supply of lubricant to the uppermost bearing surfaces.

Figure 1:
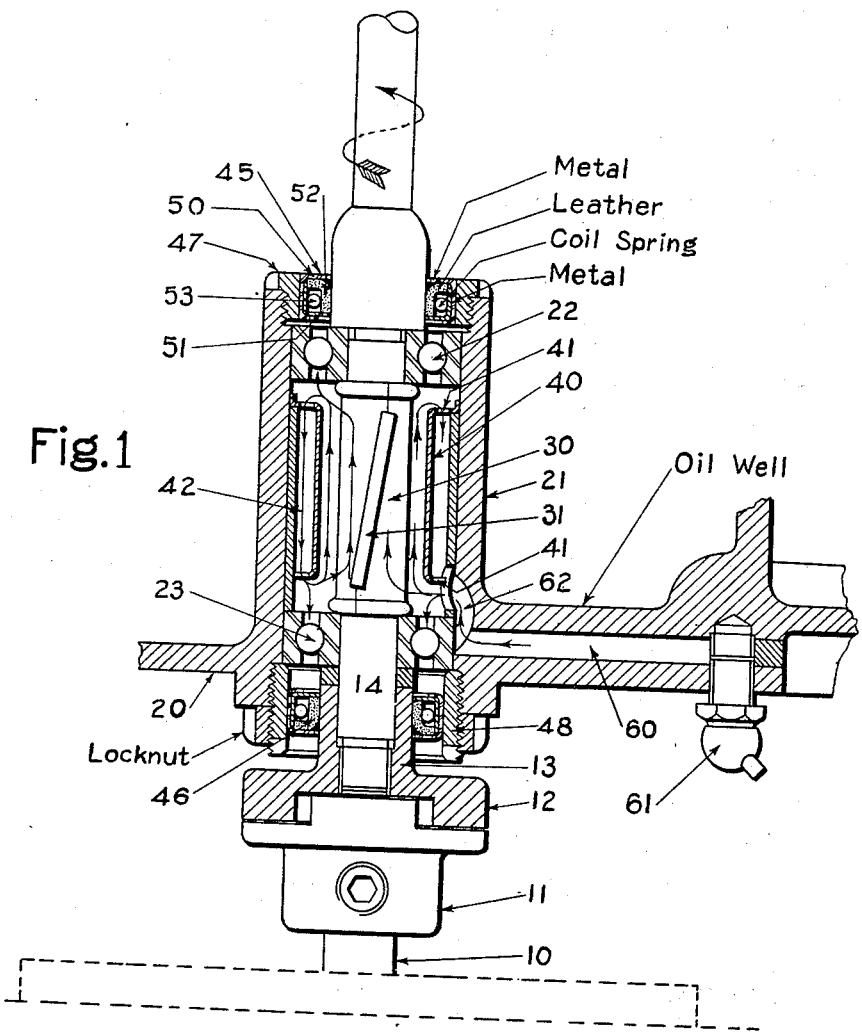
Figure 2:
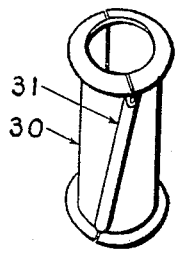
Figure 4:
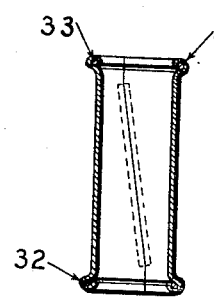
Figure 3:
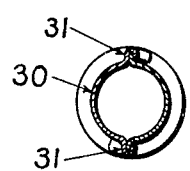

Still other objects will readily occur to those skilled in the art upon reference to the following description and the accompanying drawing, in which Figure 1 is a vertical sectional view of a bearing assembly involving the invention and adapted particularly for oil burners of the rotary type, while Figures 2, 3, and 4 are, respectively, a perspective view, a cross section and a longitudinal section of the pump element.

In the drawing, which shows a portion of one of the well known forms of rotary oil burners, the motor shaft is shown at (10) having fixed thereon one part (11) of a coupling of which the other part (12) is provided with a sleeve portion (13) in which is fixed the shaft (14). This latter shaft extends up through the bearing and carries on its upper portion the rotating elements of the burner (these not being shown).

The frame or stationary portion of the burner unit comprises a horizontal wall (20) which, in the specific burner unit forms the bottom of a container for the oil fuel. This wall (20) has at its central portion an upwardly extending bearing sleeve or journal (21) through which extends the shaft (14) and in which are mounted the outer races of upper and lower ball or roller bearing units 22 and 23 respectively, the inner races being carried on shaft 14.

Also carried on shaft (14) between bearings 22 and 23 is a pump element or impeller (30) shown in detail in Figures 2, 3, and 4 of the drawing. This element or impeller (30) comprises a sleeve having a plurality of blades (31) arranged helically about the sleeve with rather a high pitch. It is preferred to make this element (30) by blanking out and forming two halves, each with side flanges which when crimped or folded over serve the double purpose of holding the parts together and forming two blades. After this formation of the sleeve and blades, the ends are preferably provided with beads in which are preferably secured, by bending in the edge of the metal, wire rings (33), the latter preventing collapse of the beads when pressure is exerted longitudinally.

Within the bearing sleeve (21) the inner diameter of which is relatively large when compared with that of shaft 14. is a third sleeve (40) which may be termed a pump casing sleeve. This sleeve (40) is supported in the bearing sleeve (21) and spaced from the latter by means of end flanges (41) which latter are perforated to permit easy flow of oil between the two sleeves 21 and 40. Sleeve 40 is positioned within a short distance of the outer edges of blades 31 and co-acts therewith to cause upward flow of lubricant when the shaft is rotated in the direction of the arrow, return flow being down through the space 42, outside of sleeve 40.

The ends of the bearing sleeve (21) are preferably sealed against leakage of lubricant by the sealing rings indicated at 45 and 46 fitting tightly within the threaded collars 47 and 48 respectively which in turn are threaded into the upper and lower ends of sleeve 21. These sealing rings 45 and 46 are of similar construction and each consists of an outer sheet metal cylindrical ring (50) flanged inwardly at its ends and embracing a similar ring (51) flanged only at one end, the second or shorter flange of ring 50 being formed after assembly to secure the parts together. Within the inner ring (51) is a flanged leather ring (52) adapted to fit closely around the shaft (14) and around the ring (52) is a spring contracting ring (53) preferably of the coil spring type.

These sealing rings are assembled as a unit and pressed into the threaded collars so as to form an oil tight contact therewith.

When, therefore, the shaft has been passed through the collars and rings, and the collars screwed into place at the ends of the sleeve 21, the latter becomes substantially a sealed chamber.

Lubricant is supplied to the chamber thus formed, by means of a passage (60) provided in the wall (20) and whose outer end is closed by means of a suitable valved member 61.

Oil or other suitable lubricant is pumped in through valve 61, passage 60, and a suitable cut out passage (62) in the inner wall of sleeve 21, passing into the space between bearings 22 and 23.

When the shaft (14) is rotated in the direction indicated, the blades (31) and sleeve (40) co-act to cause oil circulation in the direction indicated by the small arrows and provide a plentiful supply of lubricant to the upper bearing 22.

Now, having described the invention and the preferred form of embodiment thereof, it is to be understood that the said invention is to be limited, not to the specific details herein set forth and illustrated, but, only by the scope of the claims which follow.

I claim:

1. A shaft bearing assembly comprising of a journal member having spaced antifriction bearings therein for supporting said shaft, sealing means for the ends of said journal a lubricant pump in said journal and operable by said shaft, said pump comprising a blade carrying sleeve formed of two semicylinders secured together by longitudinally extending flanges folded together, said folded flanges constituting the said blades.

2. As an article of manufacture a tubular blade carrying device consisting of two semicylindrical portions each provided with longitudinal radially extending flanges, said flanges being folded together to thereby secure the parts, said folded flanges lying outside of the cylindrical surface to thereby form longitudinal blades upon said device.

WILLIAM C. GRAUL.